US010183619B1

(12) United States Patent
Biederman

(10) Patent No.: US 10,183,619 B1
(45) Date of Patent: Jan. 22, 2019

(54) VEHICLE CHILD ONBOARD VISUAL ALERT DEVICE

(71) Applicant: Avalon Biederman, Lake Worth, FL (US)

(72) Inventor: Avalon Biederman, Lake Worth, FL (US)

( * ) Notice: Subject to any disclaimer, the term of this patent is extended or adjusted under 35 U.S.C. 154(b) by 212 days.

(21) Appl. No.: 15/156,563

(22) Filed: May 17, 2016

(51) Int. Cl.
*B60Q 9/00* (2006.01)
*G08B 21/24* (2006.01)
*G09F 3/00* (2006.01)
*G09F 21/04* (2006.01)

(52) U.S. Cl.
CPC ............... *B60Q 9/00* (2013.01); *G08B 21/24* (2013.01); *G09F 3/0288* (2013.01); *G09F 21/04* (2013.01)

(58) Field of Classification Search
CPC .... B60N 2/26; B60N 2/28; B60Q 9/00; B60R 13/00; B60R 22/00; G08B 5/00; G08B 5/02; G08B 21/02; G08B 21/22; G08B 21/24
USPC ......... 116/28 R, 200, 306, 307; 40/591, 593; 340/457, 457.1
See application file for complete search history.

(56) References Cited

U.S. PATENT DOCUMENTS 2,510,224 A * 6/1950 Hettinger ............ A44C 5/0015 224/219
2,887,804 A * 5/1959 Wise ........................ A47G 1/14 40/593
3,237,330 A * 3/1966 Dinstbir .................... G09F 1/14 116/28 R
D245,834 S * 9/1977 Wilbert ........................ D11/117
5,719,828 A * 2/1998 Haas et al. ................ G04F 1/00 116/200
D415,976 S * 11/1999 Be .................................... D11/4
D432,446 S * 10/2000 Santos ............................ D11/5
6,163,997 A * 12/2000 Deralas .................... A47G 1/06 40/593
6,802,279 B1 * 10/2004 Johnson .................. G09F 11/23 116/306
7,555,858 B2 * 7/2009 Binder et al. ............. G09F 3/08 248/205.3
7,726,736 B1 * 6/2010 Grago, Jr. et al. ....... B60N 2/28 24/3.2
8,136,283 B1 * 3/2012 Lewis ................... G09F 3/0288 283/61
8,395,511 B2 * 3/2013 Desjardins ............. B60N 2/002 340/457
8,455,074 B2 * 6/2013 Emmert ................ G09F 3/0288 283/106

(Continued)

*Primary Examiner* — R. A. Smith
(74) *Attorney, Agent, or Firm* — Malin Haley DiMaggio & Bowen, P.A.

(57) ABSTRACT

A noncomplex, extremely inexpensive childcare alert device to prevent a vehicle operator from leaving a child in a vehicle unattended. The system includes an elongated visual display tag that includes a slot for suspending the tag from the shaft of a rearview mirror located in the front seat of the vehicle. The tag body includes indicia that can be bold black letters on a highly bright colorful tag surface that reminds the vehicle operator that the operator should remove an infant in a car seat when exiting the vehicle. The device also includes a vehicle operator wristband that also has printed text reminding the wearer of the infant, to remove a child from the vehicle. The tag can easily be stored in a glove compartment or on a sun visor when not in use.

1 Claim, 3 Drawing Sheets

(56) References Cited

U.S. PATENT DOCUMENTS

| | | | | |
|---|---|---|---|---|
| 2006/0176183 | A1* | 8/2006 | Jetton | G08B 21/0288 340/573.1 |
| 2007/0220793 | A1* | 9/2007 | Mappes | G09F 21/04 40/593 |
| 2008/0209781 | A1* | 9/2008 | Mortensen | G09F 11/18 40/517 |
| 2009/0076675 | A1* | 3/2009 | Desjardins | B60N 2/002 701/33.4 |
| 2013/0082831 | A1* | 4/2013 | Byrne | B60N 2/28 340/457 |

* cited by examiner

VEHICLE CHILD ONBOARD VISUAL ALERT DEVICE

BACKGROUND OF THE INVENTION

Field of the Invention

This invention relates generally to a device to prevent leaving an infant child unattended in a vehicle, and specifically to a childcare alert device that includes a visual alert tag mounted in a vehicle having an infant child for observation by the vehicle operator along with a wristband for the vehicle operator as a reminder to prevent leaving the child unattended in a vehicle.

Description of Related Art

Every year in the United States a number of small infants and children are left unattended in a vehicle because the vehicle operator can be distracted and forget the presence of the infant in the vehicle resulting in death or severe injury to the infant. Numerous mechanical and electrical devices have been shown in the prior art that include alarm bells and electrical systems that announce the presence of an infant in an infant car seat. These systems can be very costly resulting in a large increase in the cost of the vehicle. Equipping every vehicle in the United States with complex electrical and mechanical devices would be impractical because many drivers do not consistently have infants onboard their vehicles.

This invention involves a childcare alert device that is noncomplex in structure and operation and at the same time extremely inexpensive to build. The childcare alert device includes an enlarged tag that includes visible indicia such as text and premade slots for attaching a photograph of an infant. The display tag serves as a reminder to a vehicle operator that a child is onboard. The tag is shaped to allow it to be hung on the windshield rearview mirror so that the tag is continuously visible to the vehicle operator and passengers at all times. The device also includes a wristband that is worn by the vehicle operator and/or other members traveling in the vehicle that also includes visible indicia that reflects the fact that a child is onboard the vehicle again as a second reminder. With the combination of the visually available childcare tag in conjunction with the wristband, the system provides an extremely noncomplex, but effective alert warning that can prevent a vehicle operator from leaving an infant unattended in a vehicle.

SUMMARY OF THE INVENTION

A vehicle childcare alert device for alerting and reminding a vehicle operator departing from the vehicle that an infant or child is on board the vehicle in order to prevent the child from being left unattended in the vehicle upon the departure of the vehicle operator.

The childcare alert device includes an elongated thin tag that includes visible indicia such as bold visual text in contrasting colors that include reminders observable by the vehicle operator of removing a child from a vehicle when the vehicle operator exits the vehicle and words such as "childcare alert". The display tag also includes a plurality of four slits or slots rectangularly disposed relative to each other to allow the mounting and insertion of a photograph of a child as a reminder. The tag also includes a large aperture near the top and a slot so that the tag is easily attached to the rearview mirror mounting shaft in a vehicle near the center of the dashboard so that the tag is readily visible for the vehicle operator or other people in the vehicle. The device also includes a wrist tag for the vehicle operator that serves as an additional reminder because the wrist band contains words such as "remove child from car or child care alert".

Indicia on the tag could be visually improved by making a large contrast in color between the tag surface color and the letters forming the text such as black and yellow.

In order to utilize the child alert device, a vehicle operator attaches the childcare alert tag suspended from the rearview mirror each time an infant child is being transported in the vehicle. The tag can easily be left in the vehicle in a convenient place such as a glove box when the vehicle is not in use and when an infant child is not being transported in the vehicle.

It is an object of this invention to provide a noncomplex and extremely inexpensive childcare alert device that warns a vehicle operator that a child is on board.

DETAILED DESCRIPTION OF THE INVENTION

Figure 1:
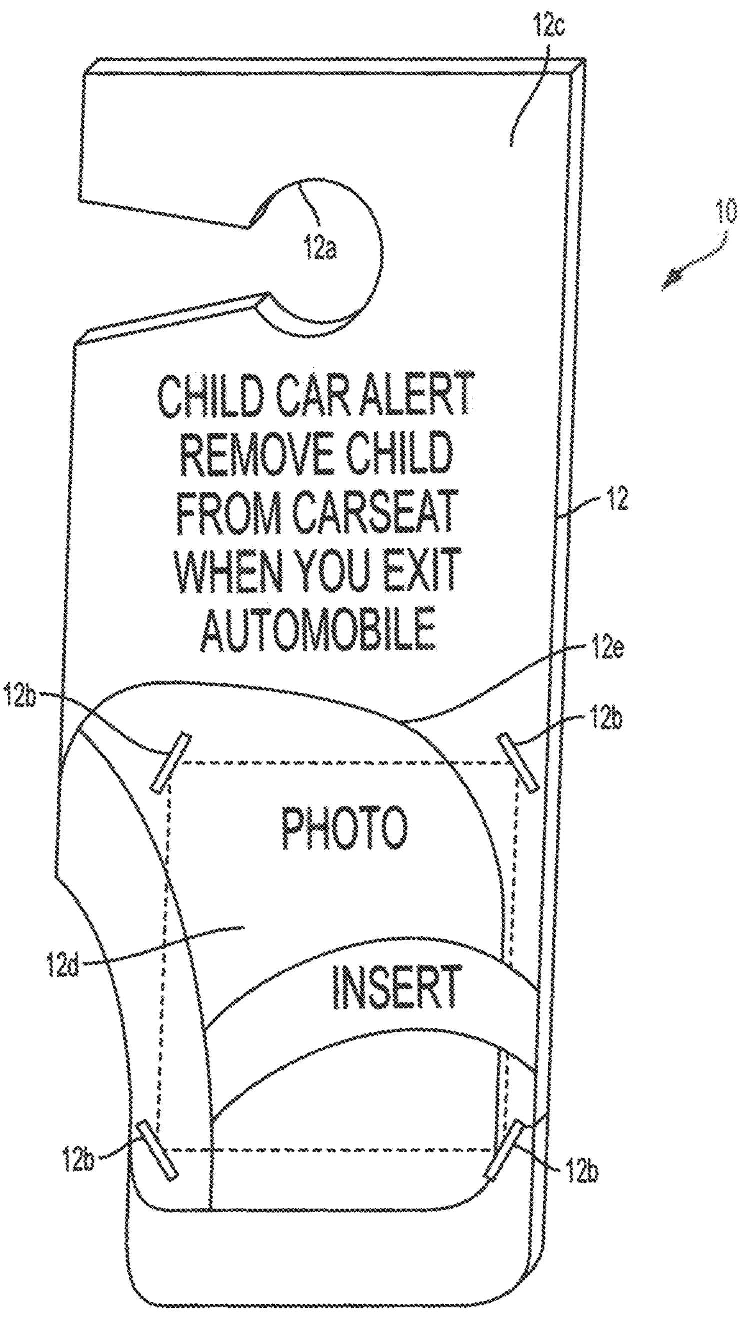
FIG. 1 shows a perspective view car alert tag used in a vehicle to remind the driver that there is a child on board.

Referring now to the drawings and in particular FIG. 1, a childcare alert tag 10 is shown that includes an elongated heavy-duty paper or cardboard body 12 that includes a circular slot 12*a* that can be attached to the rearview mirror support shaft found in an automobile or truck, typically over the dashboard. The tag body 12 includes indicia that reminds or alerts a vehicle operator that there is a child in the vehicle. As shown in FIG. 1, the tag body could be of a highly visually bright and colorful background such as yellow that would offer contrast to black, bold text letters such as "CHILD CARE ALERT REMOVE CHILD FROM CAR-SEAT WHEN YOU EXIT AUTOMOBILE".

The tag 10 also includes a plurality of cutouts or slits 12*b* that may be arranged in a rectangle to receive and attach a photograph of a baby (photo not shown in FIG. 1) to cover the words "PHOTO INSERT". Having a photograph of a child attached to the tag 12 will amplify the visual reminder that there is a child on board the vehicle.

In addition, the lower portion of the tag may include the impression or image of a child seat shown at 12*e* that is positioned below the photo insert area. Again, this is used to reinforce the fact that there is a child seat and a child onboard to remind the vehicle operator not to abandon the child when leaving the vehicle.

Figure 2:
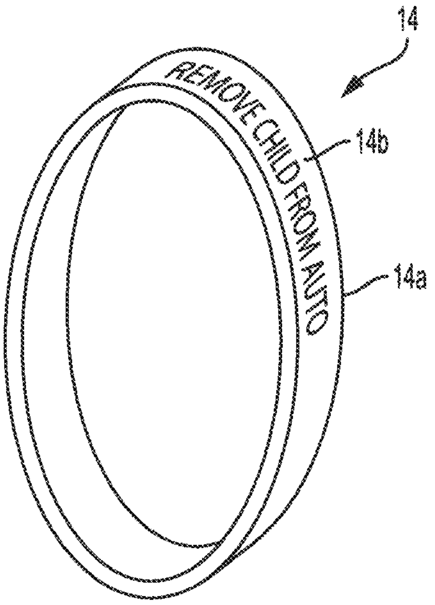
FIG. 2 shows a perspective view of a wristband used with the present invention to remind a vehicle operator that a child is on board the vehicle.

Referring now to FIG. 2, an additional memory aid for a vehicle driver may be utilized with the device in the form of a lightweight plastic wristband that would include large contrasting letters with indicia such as "REMOVE CHILD FROM AUTO". Another phrase or sentence could be used on the wristband such as "WHERE IS YOUR CHILD?"

Figure 3:
FIG. 3 is an alternative embodiment of the invention.

FIG. 3 is an alternate embodiment of the invention tag 100 has a paper or cardboard body 120 that includes a shaped bottom edge displaying the bottom of a car seat 120*a* illustrated on tag 120 along with a baby photo 120*b*. Tag body cutout 120*c* can be used to hang the tag 100 from a vehicle mirror shaft.

To utilize the device, the vehicle operator that is transporting a child car seat, normally in the back seat of the vehicle, would place the child alert tag 10 on the shaft supporting the rearview mirror so that the tag is extremely visible from the perspective of the vehicle operator below the rearview mirror which would not be such a distraction that could cause a traffic accident. Upon reaching the destination, vehicle operator could easily remove the child car alert tag 10 while exiting the vehicle and retrieving child in the back seat. In addition to the child care tag demonstratively displayed from the rearview mirror of the vehicle, the vehicle operator will have a wristband as a reinforcement that there is a child onboard in the vehicle.

When the device is not in use such as when there is no child onboard the vehicle, the childcare alert tag 10 can be easily stored in a glove compartment or on top of the sunshades in the vehicle.

What I claim is:

1. A system having at least two different indicia displays to remind a vehicle operator that a child is onboard a vehicle comprising:

a tag including a slot for a tag support for attaching the tag to the shaft of a rearview mirror located in a vehicle that includes a child in a child seat, said tag having a body made of a thin sheet material, an indicia display that includes a bright color uniform on said tag surface, and bold printed indicia on one side of said tag to remind a vehicle operator to remove a child from the vehicle; said tag including a plurality of slits for inserting a photograph on a portion of the surface of said tag; and a wristband made of a bright color that includes bold contrasting letters forming an indicia display clearly visible on said wristband to remind person wearing a wristband that there is a child onboard a vehicle.

* * * * *